United States Patent [19]

Kaneko

[11] Patent Number: 4,989,093
[45] Date of Patent: Jan. 29, 1991

[54] CAMERA AUTOMATICALLY OPERABLE IN A FLASH PHOTOGRAPHIC MODE FOR PROVIDING COLOR-BALANCED IMAGES

[75] Inventor: Kiyotaka Kaneko, Tokyo, Japan

[73] Assignee: Fuji Photo Film Co., Ltd., Kanagawa, Japan

[21] Appl. No.: 300,940

[22] Filed: Jan. 24, 1989

[30] Foreign Application Priority Data

Jan. 25, 1988 [JP] Japan ............... 63-7806[U]

[51] Int. Cl.$^5$ ............................................. H04N 5/235
[52] U.S. Cl. .......................... 358/213.19; 358/213.13; 358/221
[58] Field of Search ............ 358/27, 29, 213.14, 358/213.16, 213.19, 213.13, 221, 161, 168, 170, 211, 909

[56] References Cited

U.S. PATENT DOCUMENTS

| | | | |
|---|---|---|---|
| 4,618,254 | 10/1986 | Therrien | 358/213.19 |
| 4,647,975 | 3/1987 | Alston | 358/209 |
| 4,658,303 | 4/1987 | Nagano | 358/213.19 |
| 4,677,489 | 6/1987 | Nishimura | 358/909 |
| 4,860,108 | 8/1989 | Saito | 358/213.13 |

FOREIGN PATENT DOCUMENTS 62-159595 7/1987 Japan .

*Primary Examiner*—Tommy P. Chin

[57] ABSTRACT

A camera changeable between an ordinary photographic mode and a flash photographic mode includes a light source identifying device for identifying the illumination light provided from a fluorescent lamp based on an output from a light measuring device. The light source identifying device is detects ripple components of the output from the light measuring device to provide a flash control signal if the detected ripple components are higher than a predetermined level. The camera is changed into a flash photographic mode in response to the presence of the flash control signal in spite of the brightness of the subject field.

19 Claims, 3 Drawing Sheets

CAMERA AUTOMATICALLY OPERABLE IN A FLASH PHOTOGRAPHIC MODE FOR PROVIDING COLOR-BALANCED IMAGES

BACKGROUND OF THE INVENTION

The present invention relates to a camera equipped with an automatic white balance controller which can provide well color balanced images of a subject even under fluorescent light.

Numerous electronic cameras, such as electronic still cameras or video cameras, are generally equipped with automatic white balance controllers. Such a camera with a white balance controller can provide a recorded image with a natural tone of color. The automatic white balance controller, provided with an image sensor such as charge coupled devices (CCDs), detects a color temperature of incident light and corrects image signals of three primary colors according to the detected color temperature.

The color temperature detection ability of such an automatic white balance controller is lowered depending upon illuminance if, in particularly, it receives a small amount of light. This leads to an insufficient white balance control. For more efficiency, there is proposed a white balance controller such as disclosed in, for example, Japanese Unexamined Patent Publication No. 62-159,595, in which white balance is adjusted according to a predetermined or selected standard color temperature when illuminance is at a too low level.

However, it is hard to effect sufficiently the control of white balance according to the color temperature of actual incident light if illuminance is too low even in the above noted white balance controller. In particular, in the case of the using of an electronic still camera indoors under the illumination of a fluorescent lamp or lamps, illuminance is certainly always insufficient. The automatic white balance controller accordingly can not often perform white balance control sufficiently for the case of illumination by fluorescent lamps, which generally have a relatively deep tincture of blue and which is necessary to be controlled in white balance.

OBJECT OF THE INVENTION

It is, therefore, an object of the present invention to provide a camera with automatic white balance control which can provide a well color-balanced image even under illumination of fluorescent lamps at a low illuminance.

SUMMARY OF THE INVENTION

The above and other ojects of the present invention are performed by providing a camera changeable between an ordinary photographic mode or natural light photographic mode and a flash photographic mode which comprises: photoelectric means for detecting light from a field, including at least a subject field to provide a photoelectric output proportional to the quantity of light detected thereby; light source deciding means for deciding whether the light received by said photoelectric element is from a fluorescent lamp, or not, based on the photoelectric output to provide a electronic flash control signal; and means for automatically changing the camera to a flash photographic mode in response to the electronic flash control signal.

A particular feature of the present invention resides in the utilization of significant ripple components of light not included in natural light but in fluorescent light.

According to a preferred embodiment of the present invention, the light source deciding means is adapted to detect ripple components of the photoelectric output from the photoelectric means and decide that the light received by the photoelectrice element is from a fluorescent lamp to provide the flash control signal only when detecting ripple components larger than a predetermined level. An automatic exposure (AE) control means of the camera changes the exposure means, including at least a shutter, to a flash photographic mode at the presence of the flash control signal.

When the light received by the photoelectric element is from a fluorescent lamp or lamps, the camera, in particular the exposure means, is automatically changed to the flash photographic mode in spite of the brightness of the subject field to be photographed and therefore the subject is photographed under a flash light which has a standard color temperature. This leads to high color reproductivity in an image. The camera of the present invention can make proper exposures even under such fluorescent light illuminations that often result in under exposures.

The present invention can be embodied not only in electronic video or still cameras but conventional film cameras, with the same results.

BRIEF DESCRIPTION OF THE DRAWINGS

The present invention will become more fully understood from the the detailed description given hereinbelow and the accompanying drawings which are given by way of illustration only, and thus, are not limitative of the present invention, and wherein.

DETAILED DESCRIPTION OF THE INVENTION

Figure 1:
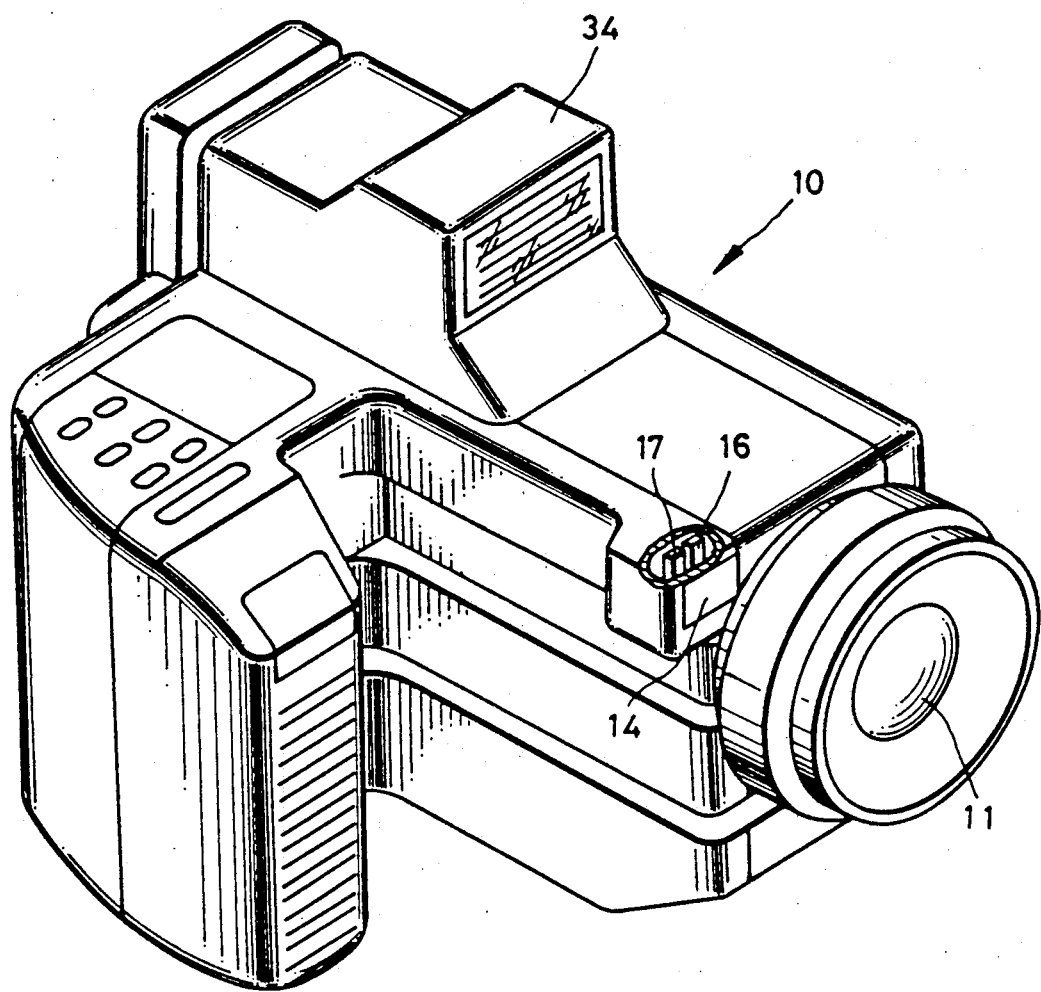
FIG. 1 is a perspective view, partly broken, showing an electronic still camera embodying the present invention.
Figure 2:
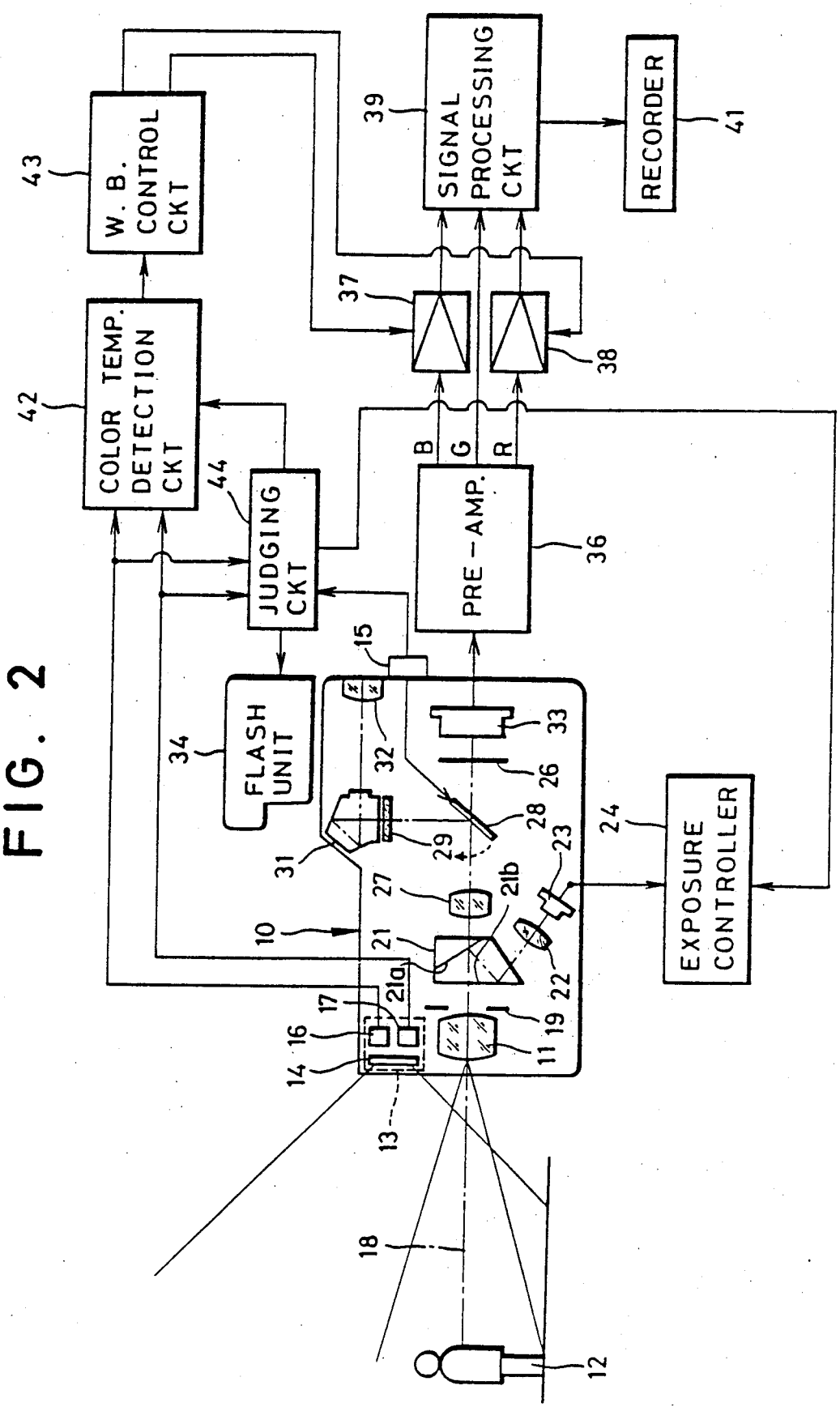
FIG. 2 is a block diagram showing details of the electronic still camera of FIG. 1.

Referring now to FIGS. 1 and 2 showing an electronic still camera embodying the present invention, the camera 10 has a taking lens 11 associated with a manual focusing mechanism or with an automatic focusing device both of which are well known in the art, to focus on a major subject 12 in the subject field to be photographed. The camera 10 has a built-in automatic white balance controller including a sensor unit 13 disposed above the taking lens 11. The white balance controller comprises a diffusion plate 14 and blue and red light sensors 16 and 17 disposed behind the diffusion plate 14. Each light sensor 16, 17 comprises a photoelectric element, such as a photodiode, and a transmittance filter of corresponding color disposed in front of and close to the photoelectric element. The respective light sensors 16 and 17 receive corresponding color components of the light from the field, including the subject field wherein the subject 12 stands, that has passed through the diffusion plate 14 and provides appropriate signals proportional to the received quantities of light, respectively. Although the taking lens 11 usually varies its angle of view between approximately 15 degrees and 60 degrees according to the focal length, it is preferred to design the photoelectric element and its associated elements to have an acceptance angle of approximately 90 degrees in order to prevent the unbalance of color components of the light received by the light sensors 16 and 17.

Behind the taking lens 11 there is a diaphragm 19 and a beam splitter 21 disposed in the optical path 18 of the taking lens 11. The light passed through the taking lens 11, after passing through the diaphragm 19 fully opened, is divided into two beams by the beam splitter 21, one of the two beams being reflected back and then forth by half mirrors 21a and 21b and directed to a photoelectric element 23 of an automatic exposure (AE) control unit 24 through a lens 22. The photoelectric element 23 provides an exposure control signal corresponding to the received quantity of light received thereby and sends it to the AE control unit 24 which determines an exposure, namely the aperture size of the diaphragm 19, and the speed of a shutter 26 in a well known manner.

The other beam travels straight and passes through the beam splitter 21, and reaches a quick return mirror 28 disposed in the optical path 18 at a right angle. The quick return mirror 28, when positioned as shown in FIG. 2, reflects the beam upwardly at a right angle and directs it to a focusing glass 29 to form an image of the subject 12 on the focusing glass 29. The image formed on the focusing glass 29 can be viewed through a finder comprising a pentagonal prism 31 and an eye piece lens 32. As is well known in the art, when a shutter release button 15 is depressed, the quick return mirror 28 quickly moves up and down. When the quick return mirror 28 moves up as shown by a phantom line in FIG. 2 and the shutter 26 simultaneously opens, the beam impinges upon an image sensor unit 33 to form an image of the subject 12 on the surface of the image sensor unit 33.

The camera 10 has an electronic flash unit 34 mounted on its top wall and cooperated therewith to radiate a flash light having a standard color temperature of approximately 5,500 degrees K toward the subject 12.

The shutter 26 is disposed between the quick return mirror 28 and the image sensor 33 and actuated to open and close at the presence of a control signal provided from the AE control unit 24 upon the depression of the shutter button 15. The image sensor unit 33 comprises an image sensor such as a charge coupled device (CCD) with a stripe filter attached thereon. The stripe filter can be of any known type. The image sensor unit 33 provides three primary color image signals R, G and B in the form of a photoelectric signal and sends them to a preamplifier (Pre-Amp) 36 for amplification. One of the amplified color signals, namely the green image signal G, is directly sent to a signal processing circuit 39 and the other two, namely the blue and red image signals B and R, are also sent to the signal processing circuit 39 but through gain control amplifiers 37 and 38, respectively. The respective color image signals R, G and B are subjected to gamma correction, matrix operation and color encoding in the signal processing circuit 39 to be transformed into video signals in accordance with a standard color television system such as an NTSC system. The video signals thus provided and transformed are sent to a recorder 41 and recorded as a still image on a floppy disk.

The blue and red sensors 16 and 17 of the sensor unit 13 provide appropriate photoelectric signals which are sent to a color temperature detection circuit 42 to be transformed into color temperature signals. A white balance (W.B.) control circuit 43 receives the color temperature signals from the color temperature detection circuit 42 to provide gain control amplifiers 37 and 38 with red and blue control signals, respectively. Each gain control amplifier 37, 38 changes its amplifying factor according to the received control signal from the W.B. control circuit 43 so as to vary the gain of color image signal. For example, if the color temperature is relatively low, the gain control amplifiers 37 and 38 change their amplification factors so as to vary the gain of the blue image signal relatively large and the gain of the red image signal relatively small, respectively. The photoelectric signals from the blue and red sensors 16 and 17 are also sent to a light source decision circuit or judging circuit 44 to decide whether the subject 12 is illuminated with fluorescent light or natural light. This decision utilizes the fact that illumination light from fluorescent lamps flicker in accordance with their commercial frequency, 50 or 60 Hz. If the sensors 16 and 17 receive illumination light from a fluorescent lamp, it will produce photoelectric signals including ripples due to such flickered illumination. Accordingly, the light source decision circuit 44 is designed to decide that the subject 12 is illuminated by a fluorescent lamp or lamps if it detects ripple components of the photoelectric signal significantly larger than a predetermined level. It is noted that although natural light will have ripple components more or less, the frequency of such ripple components of natural light is significantly lower that that of light emitted from fluorescent lamps and is sharply distinctive. The light source decision circuit 44, only when it decides that the illumination light is fluorescent light, provides the color temperature detection circuit 42 and the AE control unit 24 with a decision signal.

In response to the presence of the decision signal, the AE control unit 24 controls the diaphragm 19 and the shutter 26 to operate suitably for flash photography and the color temperature detection circuit 42 disregards the photoelectric signals from the blue and red sensors of the sensor unit 13 and provides a specified color temperature signal for causing the electronic flash 34 to produce flash light having a color temperature of approximately 5,500 degrees K.

Figure 3:
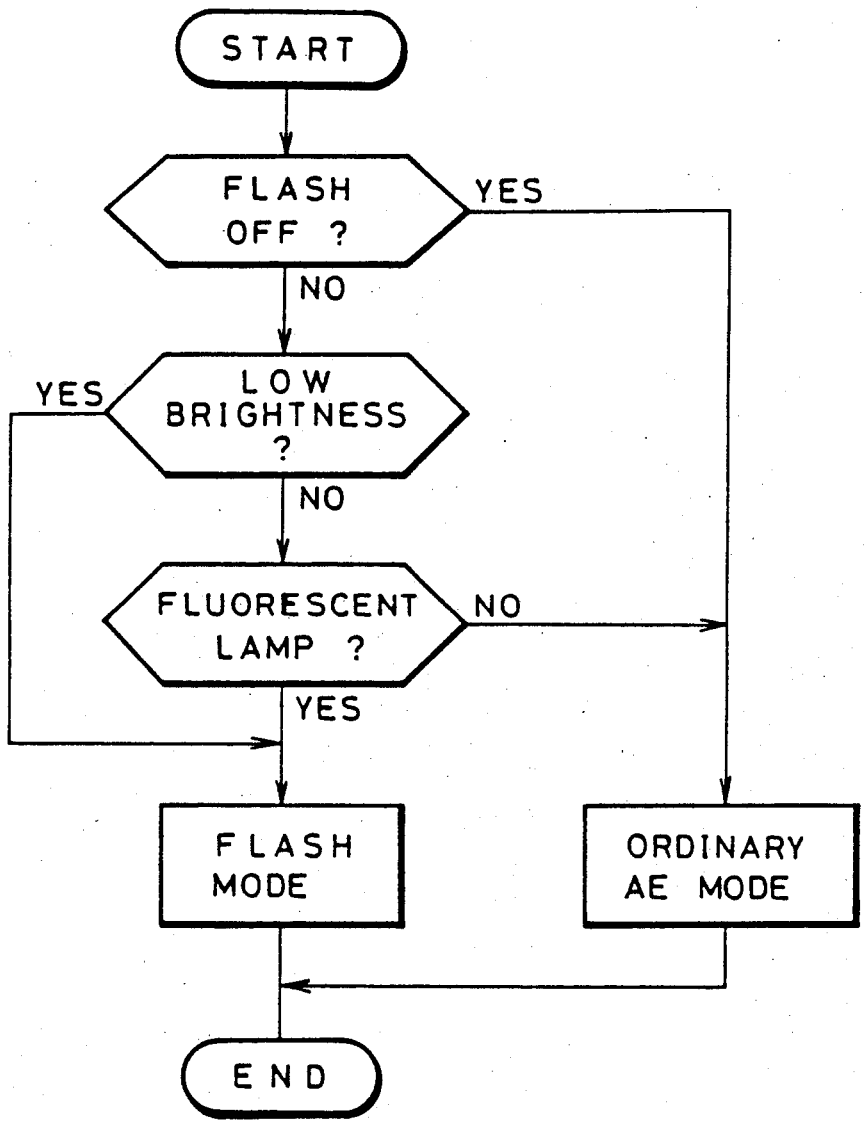
FIG. 3 is a flow chart illustrating the sequence of operation of the camera of FIG. 1.

The operation of the camera thus constructed will be fully understood by reviewing the flow chart shown in FIG. 3. During viewing of the subject 12 through the finder of the camera 10 to accomplish framing, and, after powering on the camera 10, the light source decision circuit 44 begins the decision regarding whether the illumination in the field including the subject is provided by a fluorescent lamp. The light reflected from the subject 12 and ambient light pass through the diffusion plate 14 and impinge upon both of the blue and red sensors 16 and 17 of the sensor unit 13. The light source decision circuit 44 detects ripple components of the photoelectric signal from each or both of the blue and red sensors 16 and 17 having a significant peak-to-peak voltage larger than a predetermined voltage. If the light source decision circuit 44 detects no ripple component having such significant peak-to-peak voltage larger than the predetermined voltage, then the light source decision circuit 44 decides that the subject 12 is lit or illuminated by natural light, providing no decision signal. In absence of the decision signal, the camera 10 is rendered operative in an ordinary automatic exposure (AE) control mode in spite of the condition of the electronic flash unit 34 switched on or off. However, if the photoelectric element 23 of the AE control unit 24 detects a brightness of the subject 12 lower than a predetermined level, the AE control unit 24 provides the electronic flash 34 with an actuating signal to make the electronic flash 34 ready for triggering even though the subject 12 is lit or illuminated with natural light.

In the AE control mode, the AE control unit 24 controls the diaphragm 19 and shutter 26 to operate so as to make a proper exposure according to the subject brightness detected through the photoelectric element 23, responding to the depression of the shutter button 15. Immediately before the operation of the shutter button 15, the quick return mirror 28 quickly moves up to allow the light reflected from the subject 12 to travel to the image sensor 33. Thus, an image of the subject 12 is formed on the image sensor 33 and transformed into photoelectric image signals thereby.

On the other hand, photoelectric signals provided from the blue and red sensors 16 and 17 of the sensor unit 13, which are latched responding to the depression of the shutter button 15, are sent to the color temperature detection circuit 42 to provides the W.B. control circuit 43 with color temperature signals. The W.B. control circuit 43 controls the gain control amplifiers 37 and 38 according to the color temperature signals, respectively, to thereby amplify the red and blue image signals R and B from the pre-amplifier 36 according to the color temperatures detected. The image signals B and R thus amplified and the image signal G are sent to the signal processing unit 39. As apparent, the signals sent to the signal processing unit 33 can all be processed in the signal processing unit 33 after the effect of color temperature has been removed. As a result, the recorder 41 can record a video image signal well corrected in white balance on the floppy disk.

If the sensor unit 13 detects light having an energy distribution containing significant ripple components particular ot fluorescent light, the light source decision circuit 44 provides the AE control unit 24 as well as the electronic flash unit 34 with the decision signal to change the camera to the flash photographic mode, even if the photoelectric element 23 detects the sufficient brightness of the subject 12 for natural light photography. When the electronic flash unit 34 is sufficiently charged, it is triggered in response to the depression of the shutter button 15. If, on the other hand, the electronic flash unit 34 is insufficiently charged, the shutter button 15 is automatically locked or disabled in a well known manner until the electronic flash unit 34 is sufficiently charged. Immediately after the electronic flash unit 34 is charged and becomes available, the shutter button 15 is unlocked or enabled to be depressed.

The AE control unit 24, upon depression of the shutter button 15, controls the diaphragm 19 and the shutter 26 to operate suitably for flash photography. In the flash photographic mode, the color temperature detection circuit 42 disregards the photoelectric signals from the sensor unit 13 and, on the other hand, provides the W.B. control circuit 43 with the specified color temperature signal which represents the color temperature of approximately 5,500 degrees K. Due to the provision of the specified color temperature signal, the W.B. control circuit 43 controls the amplification factor of each gain control amplifier 37, 38, providing the video recorder 41 with color video signals well amplified and therefore corrected in color balance through the signal processing unit 39. It is to be noted that the camera is controlled to operate in the AE control mode even though the subject 12 is illuminated with fluorescent light or has low brightness, when the electronic flash 34 is disabled to operate or turned off.

In order to determine if the light source illuminating or lighting the subject field, in particular the subject 12, is flourescent, the above embodiment utilizes the fact that fluorescent light has significant ripple components depending on the lights commercial frequency. Alternatively, it is also effective to utilize the fact that fluorescent light has no radiation energy distribution within the range of infrared wavelengths, as opposed to that from natural light. If using the photoelectric element of the AE control unit to detect ripple components of the light reflected from the subject, the present invention can be easily embodied in any conventional film cameras.

Although the present invention has been fully described by way of the preferred embodiment thereof with reference to the accompanying drawings, it is to be noted that various changes and modifications apparent to those skilled in the art which do not depart from the scope of the present invention are intended to be included within the scope of the following claims.

What is claimed is:

1. A camera changeable to a flash photographic mode, comprising:
   photoelectric means for detecting light from a subject field to provide a photoelectric output proportional to the quantity of said light detected therefrom;
   means for deciding if said light detected by said photoelectric means is fluorescent light based on said photoelectric output to provide a signal; and
   means for automatically changing said camera to said flash photographic mode in response to the presence of said signal.

2. A camera as defined in claim 1, wherein said camera has an image sensor disposed in a focal plane of a taking lens of said camera for providing image signals of an image focused thereon of three primary colors, blue, green and red.

3. A camera as defined in claim 2, further comprising amplifiers for respectively amplifying said blue and red image signals to be recorded by an electronic recording means.

4. A camera as defined in claim 3, further comprising color temperature detecting means for providing control signals representative of blue and red color temperatures of said light detected by said photoelectric means to control said amplifiers to change their gain according to said blue and red color temperature.

5. A camera as defined in claim 4, wherein said means for deciding is a ripple detecting means for detecting ripple components contained in said photoelectric output which are larger than a predetermined level indicative of fluorescent light.

6. A camera as defined in claim 5, wherein said ripple detecting means controls said color temperature detecting means to disregard said photoelectric outputs and to provide a predetermined level of a specific color temperature.

7. A camera as defined in claim 6, wherein said specific color temperature is approximately 5,500 degrees K.

8. A camera changeable between a natural light photographic mode and a flash light photographic mode, comprising:

photoelectric means for detecting light from a subject field to provide a photoelectric output proportional to the quantity of said light detected therefrom;

ripple detecting means for detecting ripple components contained in said photoelectric output which are larger than a predetermined level to provide a control signal; and mode changing means for automatically changing said camera to said flash photographic mode in response to the presence of said control signal.

9. A camera as defined in claim 8, wherein said mode changing means includes an automatic exposure control means for automatically controlling an exposure means including at least a shutter and electronic flash triggering means.

10. A camera as defined in claim 9, wherein said automatic exposure control means is changeable between said natural light photographic mode and said flash photographic mode.

11. A camera as defined in claim 10, wherein said automatic exposure control means is changed to said flash photographic mode in response to the presence of said control signal.

12. A camera as defined in claim 10, wherein said exposure control means is changed to said natural light photographic mode in the absence of said control signal.

13. A camera as defined in any one of claims 8 to 12, wherein said camera has an image sensor disposed in a focal plane of a taking lens of said camera for providing image signals of an image focused thereon of three primary colors, blue, green and red.

14. A camera as defined in claim 13, further comprising amplifiers for respectively amplifying said blue and red image signals to be recorded by an electronic recording means.

15. A camera as defined in claim 14, further comprising color temperature detecting means for providing control signals representative of blue and red color temperatures of said light detected by said photoelectric means to control said amplifiers to change their gain according to said blue and red color temperatures.

16. A camera as defined in claim 15, wherein said ripple detecting means controls said color temperature detecting means to disregard said photoelectric outputs and to provide a predetermined level of control signal which is equivalently representative of a specific color temperature.

17. A camera as defined in claim 16, wherein said specific color temperature is approximately 5,500 degrees K.

18. A method of changing a camera to a flash photographic mode, comprising the steps of:

detecting light from a subject field with a photoelectric means to provide a photoelectric output proportional to the quantity of said light detected therefrom;

deciding, in a decision means, if said light detected by said photoelectric means is fluorescent light based on said photoelectric output to provide a signal; and automatically changing said camera to said flash photographic mode in response to the presence of said signal.

19. A method of changing a camera between a natural light photographic mode and a flash light photographic mode, comprising:

detecting light from a subject field with a photoelectric means to provide a photoelectric output proportional to the quantity of said light detected therefrom;

detecting ripple components contained in said photoelectric output, in a ripple detecting means, which are larger than a predetermined level to provide a control signal; and automatically changing said camera to said flash photographic mode in response to the presence of said control signal.

* * * * *